United States Patent
Duval-Arnould et al.

(10) Patent No.: US 11,328,624 B2
(45) Date of Patent: May 10, 2022

(54) MEDICAL SENSORS FOR CLINICAL AND TRAINING APPLICATIONS

(71) Applicant: THE JOHNS HOPKINS UNIVERSITY, Baltimore, MD (US)

(72) Inventors: Jordan Duval-Arnould, Baltimore, MD (US); Julie Campbell, Westerly, RI (US); Elizabeth Hunt, Stevensville, MD (US)

(73) Assignee: THE JOHNS HOPKINS UNIVERSITY, Baltimore, MD (US)

( * ) Notice: Subject to any disclaimer, the term of this patent is extended or adjusted under 35 U.S.C. 154(b) by 311 days.

(21) Appl. No.: 16/744,879

(22) Filed: Jan. 16, 2020

(65) Prior Publication Data

US 2020/0152090 A1    May 14, 2020

Related U.S. Application Data

(62) Division of application No. 14/488,461, filed on Sep. 17, 2014, now Pat. No. 10,580,324.

(60) Provisional application No. 61/879,378, filed on Sep. 18, 2013.

(51) Int. Cl.
G09B 23/28    (2006.01)

(52) U.S. Cl.
CPC .................... G09B 23/288 (2013.01)

(58) Field of Classification Search
CPC .................................................. G09B 23/288
USPC ......................................................... 434/265
See application file for complete search history.

(56) References Cited

U.S. PATENT DOCUMENTS

| | | | |
|---|---|---|---|
| 8,251,703 B2 | 8/2012 | Zamierowski et al. | |
| 8,734,161 B1 | 5/2014 | Centen et al. | |
| 2002/0055694 A1 | 5/2002 | Halperin et al. | |
| 2004/0082888 A1 | 4/2004 | Palazzolo et al. | |
| 2004/0267325 A1 | 12/2004 | Geheb et al. | |
| 2008/0171311 A1 | 7/2008 | Centen et al. | |
| 2010/0022904 A1 | 1/2010 | Centen | |
| 2010/0049266 A1 | 2/2010 | Ochs et al. | |
| 2010/0160839 A1 | 6/2010 | Freeman et al. | |
| 2011/0117529 A1 | 5/2011 | Barash et al. | |
| 2012/0078031 A1* | 3/2012 | Burke | A61M 60/50 600/16 |
| 2015/0351647 A1 | 12/2015 | Dantu et al. | |
| 2017/0172844 A1 | 6/2017 | Centen | |

* cited by examiner

Primary Examiner — Robert P Bullington, Esq.
(74) Attorney, Agent, or Firm — MH2 Technology Law Group LLP

(57) ABSTRACT

The present invention is directed to systems for interfacing between sensors and sensor simulators and clinical monitors and devices. The present invention is used to incorporate sensors and sensor simulators into training and clinical demonstrations. A system in accordance with the present invention includes a hardware component configured to transmit an output signal associated with a typical clinical sensor such as sensors for end-tidal $CO_2$ pulse oximetry, temperature, blood pressure, near-infrared spectroscopy (NIRS) sensors, and CPR sensors to a clinical monitor or similar device. The system of the present invention also provides a software component to produce and transmit or to receive and make use of the simulated or actual sensor; the system also provides a hardware component to interface the software component to the clinical monitor, defibrillator, and/or sensor.

20 Claims, 2 Drawing Sheets

MEDICAL SENSORS FOR CLINICAL AND TRAINING APPLICATIONS

CROSS REFERENCE TO RELATED APPLICATIONS

This application is a divisional application of U.S. application Ser. No. 14/488,461 filed on Sep. 17, 2014, and claims the benefit of U.S. Provisional Patent Application No. 61/879,378 filed on Sep. 18, 2013, which are incorporated by reference, herein, in their entirety.

FIELD OF THE INVENTION

The present invention relates generally to sensors. More particularly, the present invention relates to medical sensors for use in at least clinical monitors, medical device, and training devices.

BACKGROUND OF THE INVENTION

Clinical monitors and smart defibrillators interact with patients, using a number of different sensors to collect necessary clinically relevant physiological findings and measurements of provider performance. High tech patient simulators do not provide the comprehensive set of connectivity elements for all of the typically critical patient characteristics and instead display simulated patient characteristics on a simulator-specific monitor. Simulator-specific monitors do not reflect the user interface of clinical monitors and smart defibrillators. It has been observed that unrealistic presentation of patient data during simulation based training causes provider confusion and reduces training authenticity, demonstrating the need for a device that interfaces simulation technology with real clinical devices.

Accordingly, there is a need in the art for such devices to interface between simulation technology and real clinical devices.

SUMMARY OF THE INVENTION

The foregoing needs are met, to a great extent, by the present invention which provides a system for interfacing with a clinical device during a simulated training including a non-transitory computer readable medium configured to generate an input signal configured to mimic an output signal from a clinical sensor and encode the input signal into a format recognized by the clinical device. The system also includes a hardware component configured to interface the non-transitory computer readable medium to the clinical device. The hardware component provides communication between the non-transitory computer readable medium and the clinical device.

In accordance with an aspect of the present invention the clinical device can take the form of at least one selected from a group consisting of a clinical monitor and a defibrillator. The input signal takes the form of at least one selected from a group consisting of a simulator controller signal, a computer-generated waveform, a real patient waveform recorded by a clinical monitor or defibrillator, and a recorded waveform from an intercepted clinical sensor signal. The non-transitory computer readable medium can be configured to encode the input signal to follow sensor-receiver protocols. The non-transitory computer readable medium can also be configured to change or adapt the input signal in real-time. The non-transitory computer readable medium is configured to simulate the output signal from at least one of the sensors selected from a group consisting of end tidal C02 (ETC02), pulse oximetry (SP02), thermometer, blood pressure, quality of CPR (QCPR), and near-infrared spectroscopy (NIRS) sensors. The system can also include an interface for a user to input parameters into the system and a patient simulator.

In accordance with another aspect of the present invention a system for providing an interface between a CPR performance measurement device and CPR performance and visualization application includes a hardware component comprising an accelerometer and a microprocessor, said microprocessor configured to convert analog output from the accelerometer to a digital signal. The CPR performance measurement device may be part of an existing QCPR assessment system, in which case, the signal from the accelerometer is intercepted and used as an input to one or more CPR performance and visualization applications. The system also includes a non-transitory computer readable medium programmed to continuously read the digital signal from the hardware component, shift digital input to zero around a moving object, solve for real-time position data as a function of acceleration input, remove signal drift, identify compressions within positions data stream by detection of local minima in real-time position data, calculate position change associated with compression and decompression for each identified local minima, and output compression depth and decompression recoil information about each CPR compression performed.

In accordance with another aspect of the present invention, the microcontroller takes the form of a PIC microcontroller. The PIC microcontroller converts analog to digital at a sampling rate of 100-1000 Hz. The non-transitory computer readable medium is further configured to convert quantitative compression and decompression data into quantitative user feedback on the quality of individual chest compressions and sets of chest compressions. The non-transitory computer readable medium is further configured to convert quantitative compression and decompression data into qualitative user feedback on the quality of individual chest compressions and sets of chest compressions. The user feedback is based on CPR guidelines and more specifically user guidelines from the American Heart association. The non-transitory computer readable medium is further configured to act as a gaming interface. The non-transitory computer readable medium is also configured to act as a training interface.

BRIEF DESCRIPTION OF THE DRAWINGS

The accompanying drawings provide visual representations, which will be used to more fully describe the representative embodiments disclosed herein and can be used by those skilled in the art to better understand them and their inherent advantages. In these drawings, like reference numerals identify corresponding elements and.

DETAILED DESCRIPTION

The presently disclosed subject matter now will be described more fully hereinafter with reference to the accompanying Drawings, in which some, but not all embodiments of the inventions are shown. Like numbers refer to like elements throughout. The presently disclosed subject matter may be embodied in many different forms and should not be construed as limited to the embodiments set forth herein; rather, these embodiments are provided so that this disclosure will satisfy applicable legal requirements. Indeed, many modifications and other embodiments of the presently disclosed subject matter set forth herein will come to mind to one skilled in the art to which the presently disclosed subject matter pertains having the benefit of the teachings presented in the foregoing descriptions and the associated Drawings. Therefore, it is to be understood that the presently disclosed subject matter is not to be limited to the specific embodiments disclosed and that modifications and other embodiments are intended to be included within the scope of the appended claims.

The present invention is directed to systems for interfacing between sensors and sensor simulators and clinical monitors and devices. The present invention is used to incorporate sensors and sensor simulators into training and clinical demonstrations. A system in accordance with the present invention includes a hardware component configured to transmit an output signal associated with a typical clinical sensor such as sensors for end-tidal $CO_2$, pulse oximetry, temperature, blood pressure, near-infrared spectroscopy (NIRS) sensors, and QCPR sensors to a clinical monitor or similar device. The system of the present invention also provides a software component that functions both to produce and transmit the signal to the hardware component and to receive and make use of signals from clinical sensors.

Figure 1:
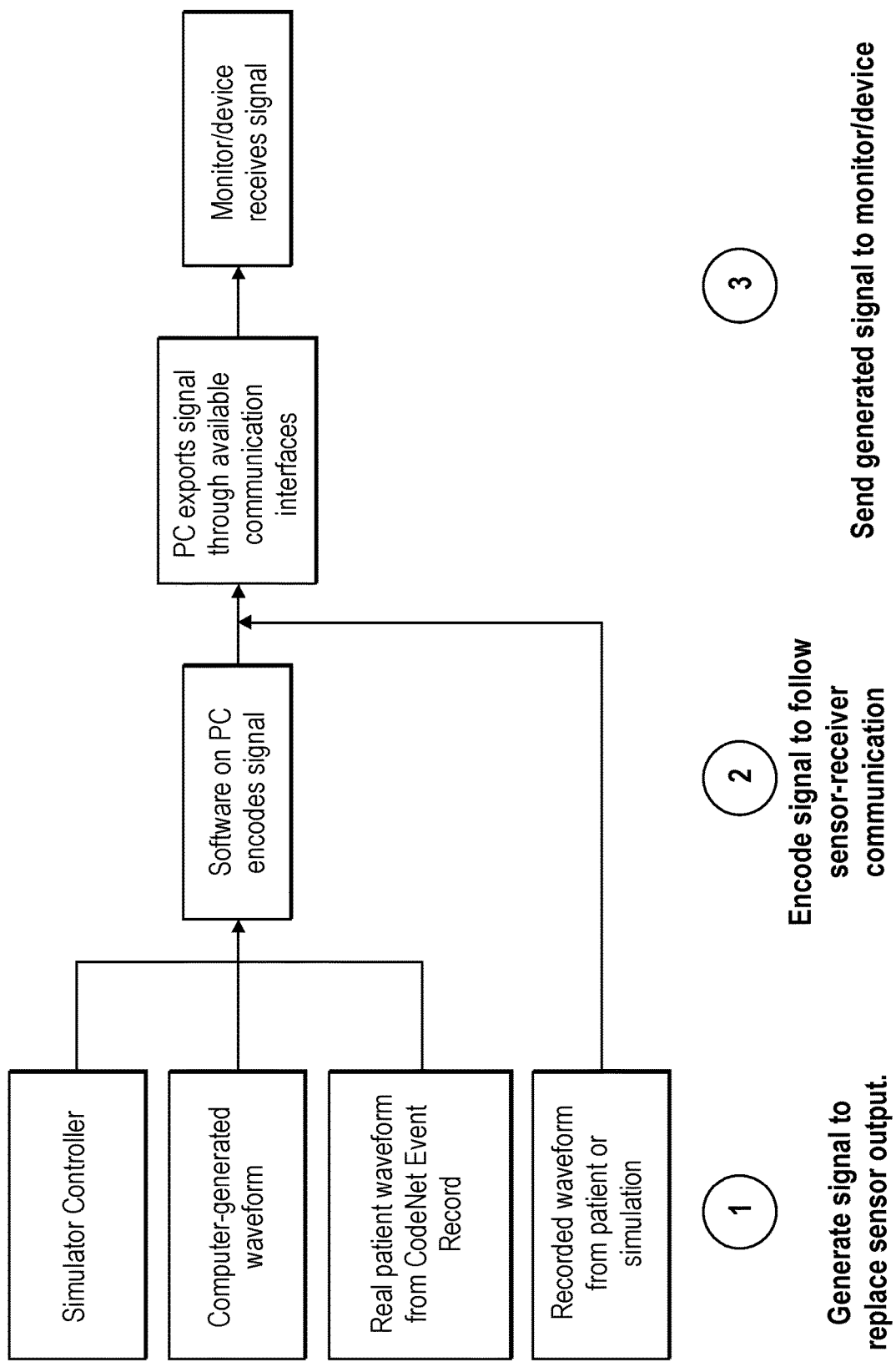
FIG. 1 illustrates a schematic diagram of an exemplary system and method for signal generation and replacement of a sensor output to be used as an input to a clinical monitor or defibrillator in accordance with an embodiment of the present invention.

FIG. 1 illustrates a schematic diagram of an exemplary system and method according to an embodiment of the present invention. As illustrated in FIG. 1, step 1 includes generating a signal to replace output from a typical clinical sensor. The typical clinical sensor output signal can be replaced in a variety of different ways with various simulated outputs. Examples of such simulated outputs include but are not limited to a simulator control signal, a computer-generated waveform, a real patient waveform recorded by a clinical monitor or defibrillator, and a recorded waveform from an intercepted clinical sensor signal. While these examples are included herein, these examples should not be considered limiting and any other suitable simulated or recorded real signal could also be used. The simulated signal can be produced or stored using a computing device or non-transitory computer readable medium associated with the system. Any other suitable computer or microprocessor could also be used, as would be known to one of skill in the art.

Also as illustrated in FIG. 1, Step 2 includes encoding the simulated signal output to follow sensor-receiver protocols, if necessary. The computing device or non-transitory computer readable medium can also be used to complete this step. In step 3, the simulated signal is sent to the monitor/device. The non-transitory computer readable medium can be used to export the signal to a hardware component configured to communicate with both the non-transitory computer readable medium and the clinical monitor, medical device or other device used in a clinical setting and known to one of skill in the art. The monitor or device receives the signal and can display it in accordance with the typical operation of that particular machine.

More particularly, this invention is composed of software components, which manage signal data, and a hardware component, which interfaces the software components to the clinical monitor or defibrillator and/or to the clinical sensor. The software components are written in Microsoft Visual C# and individually manage signal data encoding, decoding, sending, receiving, storage and retrieval. The operator-controllable waveform data from a human patient simulator was accessed using the Laerdal software development kit and streamed to encoding and sending software components. The sending software component routes the data to the hardware interface and finally into the defibrillator. Waveforms drawn or printed on rhythm strips can also be isolated, stored, encoded, and sent to the defibrillator using this technology. The hardware component provides a vehicle for data stream communication between the computer-run software programs and the clinical monitor or defibrillator.

An exemplary embodiment of this invention is described herein, and is merely included as an illustration and the invention can take any suitable form known to or conceivable by one of skill in the art. The exemplary embodiment is implemented to take the place of a CAPNOSTAT5 device.

Sources of CAPNOSTATS $ETCO_2$ Signals

All numeric, generated signals will need to be encoded in a manufacturer-specified format that matches the sensor's digital signal encoding format. This encoding will be done using a C# software application referred to as encoding software throughout this document. This encoding information was not used to define a protocol or to demonstrate proof of concept for generating/sending signals that were recorded from the sensor and replayed by the computer to a clinical monitor/device.

All inputs can be encoded and sent to a clinical monitor/defibrillator or can be saved in simple XML format for later use. Files saved in XML format can later be sent to a clinical monitor/defibrillator using a C# software application. Prototypes have been developed and successfully tested for all inputs described below.

1. User Input through Simulator Controller

All high-technology simulator mannequins have a mannequin-specific software platform that is loaded on a PC or tablet. This software-based user interface can be used to control realistic and clinically measurable mannequin characteristics, such as heart rhythm, and to control non-measurable vital parameters that are projected on a simulator-specific monitor that acts as the bedside monitor in simulated events. The waveform and/or value set for a specific vital sign, such as ETC02, on the simulator software could be used as an input into the encoding software. This transfer of simulated ETC02 data from the simulation software to our encoding software is made possible via the use of the SimMan SDK.

2. User Input through Separate User Interface

A simulated ETC02 waveform can be generated via our C# waveform generator that creates a continuous waveform of interchanging exponential rise and decay based on set parameters. This simulated waveform can be sampled to retrieve a stream of ETC02 waveform data points; these data points will be encoded using our encoding software.

3. Retrieval of ETC02 Waveform from Zoll CodeNet Record

Zoll R-Series defibrillators, which are currently used in all pediatric centers in the Johns Hopkins Hospital and are in the process of being phased into adult centers, generate a CodeNet report each time the defibrillator is powered on. These reports include the ETC02 waveform for the entire event, which is logged from the CAPNOSTAT5 ETC02 sensor that plugs into the Zoll R-Series defibrillator. The waveform and corresponding respiratory rates from the Zoll CodeNet report could be used as numeric input for the encoding software.

4. Replay a Recorded CAPNOSTAT5 Sensor Signal

A CAPNOSTAT5 sensor signal from a real patient or a high-technology mannequin, with the capability to interact with an ETC02 sensor, can be directly recorded to a computer to be saved as a digital byte stream by our own C# recording software. This byte stream can be saved in a simple XML format and/or exported to a clinical monitor/device directly.

5. Ventilation Sensor-Dependent Waveform

A simulated ETC02 waveform that directly reflects the actions of a provider's performance of manual patient ventilation can be generated via our C# waveform generator; the characteristics of this generated waveform, including visual and numeric respiratory rate and ETC02 amplitude, are dependent upon the output of a ventilation detection sensor. The pressure sensor in this technology outputs to a microcontroller, which provides minimal analysis and wireless communication between the sensor and the waveform generator software on a computer. This input allows for the realistic, automated display of provider performance on the clinical monitor/defibrillator during simulation.

6. Digitized Waveform

Custom C# software has been developed to convert JPG and BMP images that contain a clinical waveform (ETC02, pulse oximeter, ECG) to a digital stream of data points to be sent as an input to a clinical monitor or defibrillator. This digital stream of data points can be directly sent to encoding software and, then, to a clinical monitor/defibrillator, or the data points can be saved in a simple XML format. Using the waveform digitizer, inputs to the defibrillator/clinical monitor can now include hand-drawn waveforms and printed patient records.

Tests for signal modification have been conducted. This device has been shown to successfully generate and encode EtC02 signals to replace the Capnostat5 sensor output, and hardware components effectively interface software-managed EtC02 data streams with the Zoll R-series defibrillator.

Use of clinical monitors and defibrillators in simulation-based training of healthcare providers increases the authenticity of training scenarios and likely increases training effectiveness; however, existing simulators do not interface with real clinical monitors. Add-on technologies (Zoll ECG Simulator, Fluke Biomedical Patient Simulators), which connect directly to clinical monitors and defibrillators, are used to bypass simulator-monitor connectivity issues. No add-on technology currently exists to allow for use of and data abstraction from clinical EtC02, QCPR, SP02, NIRS, thermometer, or blood pressure sensors with clinical monitors and defibrillators in simulation-based training. The 2010 AHA guidelines for CPR and ECC recommend the use of EtC02 to measure the quality of chest compressions and guide the quality of resuscitation; however, few high-technology simulators allow for the realistic integration of EtC02, QCPR, SP02, NIRS, thermometer, or blood pressure into simulation-based training. Incorporation of this simulator-independent technology will allow for the transition of simulation-based CPR and ECC training to include clinical monitors and defibrillators without the need to alter existing simulators. This device effectively interfaces simulators to clinical devices, and this research will be continued to provide device compatibility with additional clinical sensors.

In another embodiment of the present invention the system can include a hardware component and a software component configured to receive, decode, analyze, and make use of clinical sensor outputs.

Figure 2:
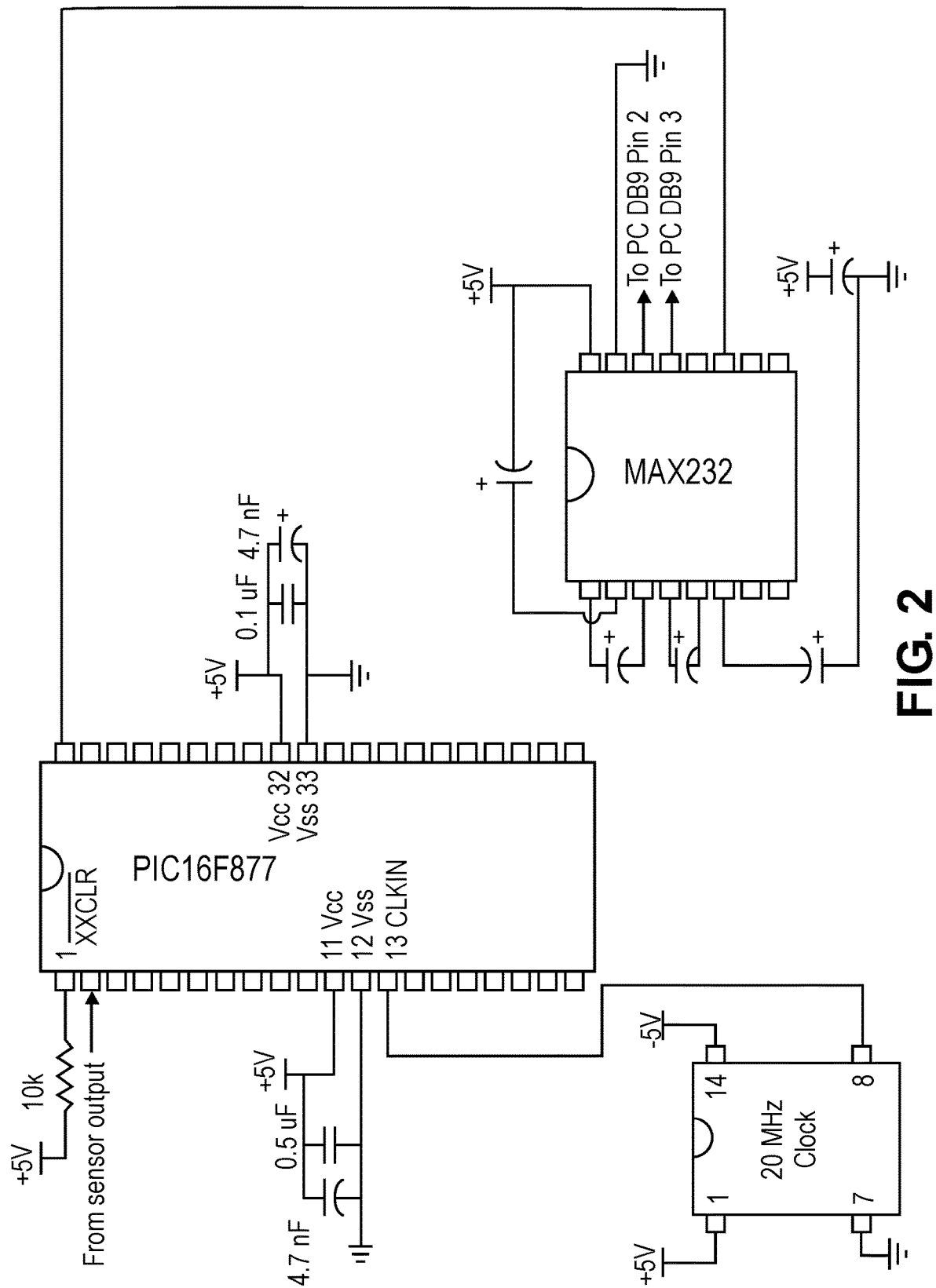
FIG. 2 illustrates a circuit diagram for hardware for accessing clinical sensor output data and feeding the data to a computing device according to an embodiment of the present invention.

A specific use of this embodiment can be used to implement CPR training with any existing clinical monitor or defibrillation device. The hardware component includes PIC microcontroller used for analogue to digital conversion of accelerometer output at sampling rate of 100 Hz. Max232 IC adapts digital signal for input to USB port of PC. FIG. 2 illustrates a circuit diagram according to an embodiment of the hardware component.

The system also includes a first software component to execute digital Signal Processing. The software continuously reads digital acceleration signal, shifts digital input to zero around a moving average, integrates "acceleration" data twice to solve for real-time "position" data as a function of acceleration input, High-pass filters "position" data as needed to remove signal drift, identifies compressions within "position" data stream by detection of local minima in "position" data, calculates position change associated with compression and decompression for each identified local minima, and outputs is compression depth and decompression recoil information about each CPR compression. The software component can be implemented on any suitable computing device or non-transitory computer readable medium known to one of skill in the art.

Any such computer application or software component will be fixed on a non-transitory computer-readable medium. It should be noted that the computer application is programmed onto a non-transitory computer-readable medium that can be read and executed by any suitable computing device such as a personal computer, desktop computer, laptop computer, server, tablet, phablet, smartphone, clinical monitor, clinical monitor simulator etc. The non-transitory computer-readable medium can take any suitable form known to one of skill in the art. The non-transitory computer-readable medium is understood to be any article of manufacture readable by a computer. Such non-transitory computer-readable media include, but are not limited to, magnetic media, such as a floppy disk, flexible disk, hard disk, reel-to-reel tape, cartridge tape, cassette tapes or cards, optical media such as CD-ROM, DVD, blu-ray, writable compact discs, magneto-optical media in disc, tape, or card form, and paper media such as punch cards or paper tape. Alternatively, the program for executing the method and algorithms of the present invention can reside on a remote server or other networked device. Any databases associated with the present invention can be housed on a central computing device, server(s), in cloud storage, or any other suitable means known to or conceivable by one of skill in the art. All of the information associated with the application may be transmitted either wired or wirelessly over a network, via the internet, cellular telephone network, or any other suitable data transmission means known to or conceivable by one of skill in the art.

The software can also include an assessment feature. The assessment feature converts quantitative compression and decompression data into quantitative and/or qualitative user feedback on the quality of individual chest compressions and sets of chest compressions based on American Heart Association CPR Guidelines. Additionally the software can include a gaming or training interface.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A system for interfacing with a clinical device during a simulated training comprising:
a non-transitory computer readable medium configured to:
generate an input signal configured to mimic an output signal from a clinical sensor;
encode the input signal into a format recognized by the clinical device; and
a hardware component configured to interface the non-transitory computer readable medium to the clinical device, such that the hardware component provides communication between the non-transitory computer readable medium and the clinical device.

2. The system of claim 1, further comprising the clinical device taking the form of at least one selected from a group consisting of a clinical monitor and a defibrillator.

3. The system of claim 1, further comprising the input signal taking the form of at least one selected from a group consisting of a simulator controller signal, a computer-generated waveform, a real patient waveform recorded by a clinical monitor or defibrillator, and a recorded waveform from an intercepted clinical sensor signal.

4. The system of claim 1, further comprising the non-transitory computer readable medium being configured to encode the input signal to follow sensor-receiver protocols.

5. The system of claim 1, wherein the non-transitory computer readable medium is configured to change or adapt the input signal in real-time.

6. The system of claim 1, wherein the non-transitory computer readable medium is configured to simulate the output signal from at least one of one or more sensors selected from a group consisting of end tidal $CO_2$ ($ETCO_2$), pulse oximetry ($SPO_2$), thermometer, blood pressure, quality of CPR (QCPR), and near-infrared spectroscopy (NIRS) sensors.

7. The system of claim 1, further comprising an interface for a user to input parameters into the system.

8. The system of claim 1, further comprising a patient simulator.

9. The system of claim 8, further comprising an interface for a user to input parameters into the patient simulator.

10. A method for interfacing with a clinical device during a simulated training comprising:
generating, by a computing device, an input signal configured to mimic an output signal from a clinical sensor;
encoding, by the computing device, the input signal into a format recognized by the clinical device; and
communicating, by the computing device, with the clinical device via a hardware component configured to interface the computing device with the clinical device.

11. The method of claim 10, wherein the clinical device comprises at least one selected from a group consisting of: a clinical monitor and a defibrillator.

12. The method of claim 10, wherein the input signal taking comprises at least one selected from a group consisting of:
a simulator controller signal,
a computer-generated waveform,
a real patient waveform recorded by a clinical monitor or defibrillator, and
a recorded waveform from an intercepted clinical sensor signal.

13. The method of claim 10, wherein encoding the input signal comprises encoding the input signal to follow sensor-receiver protocols.

14. The method of claim 10, further comprising changing or adapting the input signal in real-time.

15. The method of claim 10, further comprising simulating the output signal from at least one of one or more sensors selected from a group consisting of:
end tidal $CO_2$ ($ETCO_2$),
pulse oximetry ($SPO_2$),
thermometer,
blood pressure,
quality of CPR (QCPR), and
near-infrared spectroscopy sensors (NIRS).

16. The method of claim 10, further comprising receiving input parameters by a user via a user interface.

17. The computer program product of claim 10, wherein the clinical device comprises at least one selected from a group consisting of: a clinical monitor and a defibrillator.

18. The computer program product of claim 10, wherein encoding the input signal comprises encoding the input signal to follow sensor-receiver protocols.

19. The computer program product of claim 10, wherein the operations further comprise changing or adapting the input signal in real-time.

20. A computer program product comprising a computer readable storage medium having program instructions embodied therewith, the program instructions executable by a computing device to cause the computing device to perform operations comprising:
generating, by a computing device, an input signal configured to mimic an output signal from a clinical sensor;
encoding, by the computing device, the input signal into a format recognized by the clinical device; and
communicating, by the computing device, with the clinical device via a hardware component configured to interface the computing device with the clinical device.

* * * * *